Nov. 19, 1963 L. PÉRAS 3,111,041
GEAR CHANGE CONTROL DEVICE FOR MOUNTING UNDER THE
STEERING WHEEL OR ON THE INSTRUMENT PANEL
Filed June 13, 1960
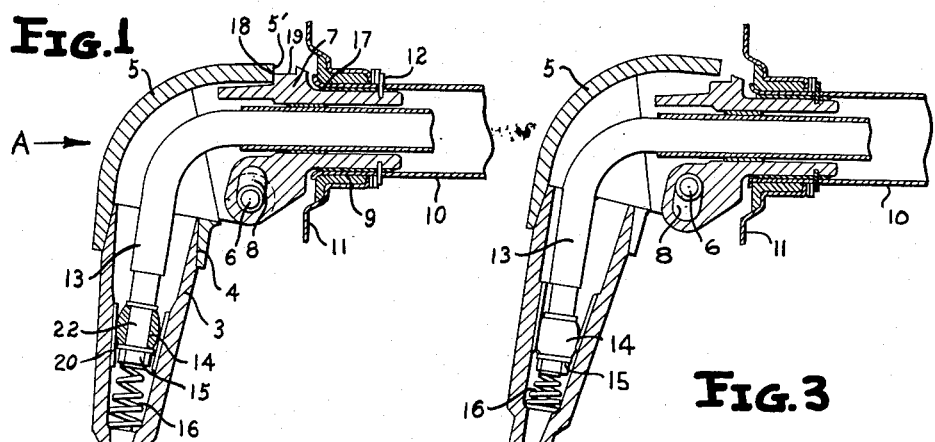
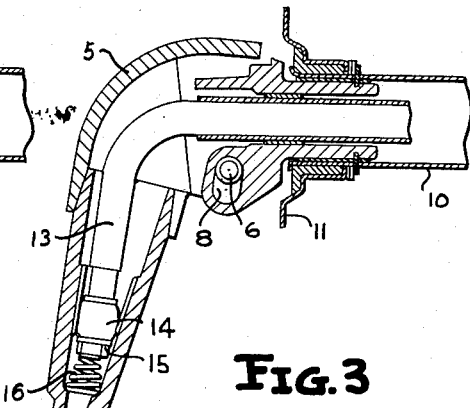
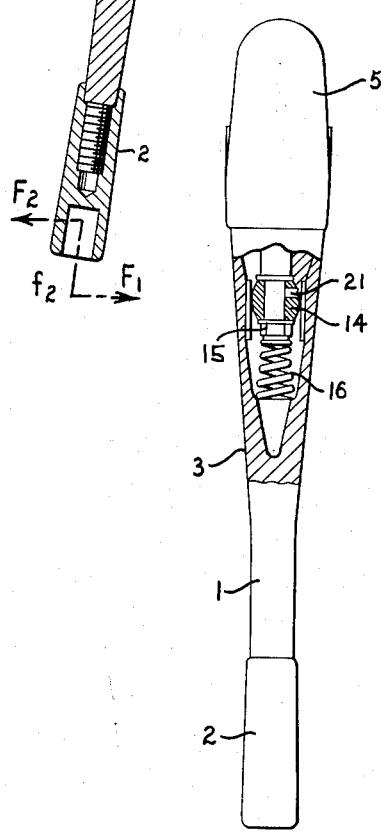
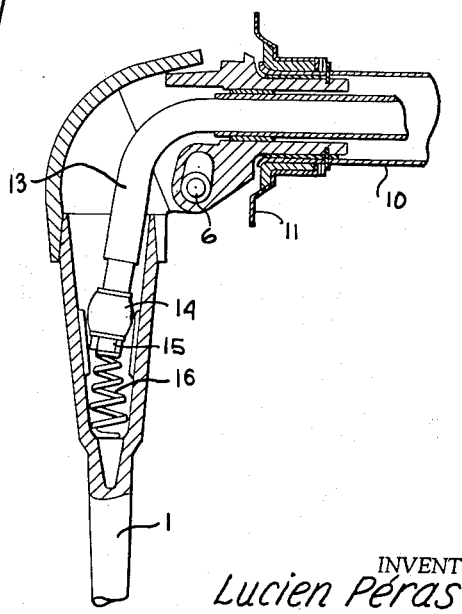
INVENTOR
Lucien Péras
BY Stevens, Davis, Miller & Mosher
ATTORNEYS

United States Patent Office 3,111,041
Patented Nov. 19, 1963

3,111,041
GEAR CHANGE CONTROL DEVICE FOR MOUNTING UNDER THE STEERING WHEEL OR ON THE INSTRUMENT PANEL
Lucien Péras, Billancourt, France, assignor to Regie Nationale des Usines Renault, Billancourt, France
Filed June 13, 1960, Ser. No. 35,608
Claims priority, application France June 24, 1959
2 Claims. (Cl. 74—484)

This invention relates to the control of change-speed gearboxes and like apparatus of automobile vehicles, and more particularly to the control of a gearbox by means of a lever carried by the instrument panel or by the steering column under the steering wheel. The device, constituting the subject-matter of this invention, comprises a bent control lever adapted to rotate on the instrument panel, for example, and to rock about a pivot axis for switching from one speed selection line to another, the rotation of this lever in the instrument panel effecting the gear change proper.

This lever may comprise a locking or detent-positioning device on one speed selection line; this device may be cleared by depressing the lever inwardly. The assembly comprises a device for adjusting the bearing of the detent-positioning or locking abutment.

In order to afford a clear understanding of this invention and of the manner in which the same may be carried out in practice, a typical embodiment thereof in the case of a four-speed gearbox control arrangement will now be described with reference to the accompanying drawings. The gearbox is of the conventional type providing four forward speeds and one reverse speed. In the case of a conventional-type gearbox providing three forward speeds and reverse, the aforesaid locking action would not be required and the lever would be pivoted in a plain round hole instead of an elongated hole as will be described presently. It will be noted that the lever is preferably made of moulded material so that a low-cost gear shift control device may be obtained.

In the drawings:
FIGURE 1 is an axial section showing the control lever assembly constituting the subject-matter of this invention, the lever being shown in the position corresponding to the selection of two forward speeds;
FIGURE 2 shows the control lever as seen in the direction of the arrow A of FIG. 1 and illustrates the device incorporated therein for adjusting the detent-positioning or locking means for the reverse shift line;
FIGURE 3 shows the control lever in a rocking position corresponding to the reverse gear;
FIGURE 4 shows the control lever in a rocking position corresponding to the selection of two different forward speeds.

Referring to the drawings, it will be seen that the control lever designated by the reference numeral 1 comprises a handle 2 at its free end and a hollow widened portion 3 at its other or inner end, this widened portion 3 being connected at 4 with a tubular crooked member 5 carrying a pivot pin 6 fitting in an elongated hole or slot 8 formed in a socket 7 rotatably mounted in a bearing 9 of the tubular member 10 secured, in this typical form of embodiment, on the instrument panel 11 of the vehicle. The socket 7 is held against axial displacement by a circlip 12 and is retained thereby on the instrument panel.

A suitably bent control rod 13 is adapted, by its rotation, to control the shift from one speed to another as will be explained presently, its displacement in the socket 7 which results from the rocking of lever 1 about the pivot pin 6 providing the desired speed line selection. This rod 13 has one end fitted in the widened end portion 3 of lever 1 and carries on this end a ball 14 engaging the inner wall of the widened portion 3. The outer end of rod 13 is threaded through a central bore formed in the ball 14 and the latter is secured by properly tightening a self-locking nut 15 engaging the threaded end of rod 13. A suitably pre-stressed coil spring 16 bears with one end against the bottom of the widened hollow portion 3 and with the other end against the nut 15. This spring 16 urges the pivot pin 6 to the bottom of the slot 8, as shown in FIGS. 1 and 4.

This rod 13 is slidably fitted in the tubular guide 17 of socket 7.

This tubular socket 7 is formed with a shoulder 18 engaged by the end 5¹ of the crooked member 5.

The control lever 1 is displaceable along its axis in the direction of the arrow $f^2$. When the driver actuates the lever in this direction, it moves upwards, the pin 6 moving in the slot 8 and the spring 16 being compressed as well as the end of its extension, the crooked member 5 escaping from the shoulder 18 to take another position above the portion 19 of socket 7, this movement causing the rod 13 to slide within the column 10 for selecting one gear line of the mechanism, and in this case the gear line corresponding to the reverse (FIG. 3) is obtained. The control lever 1 is then kept in the position corresponding to this selection for the reverse by the tension of spring 16, the latter having been compressed by the depression of lever 1 along its axis, while the ball 14 has moved within the tubular bearing 20 lining the inner wall of the widened portion 3. Thus, the axis of spring 16 is inclined with respect to the axis of the bore formed in ball 14 and thus the end of the crooked member 5 is urged to a position in which it registers with the portion 19 as indicated in FIG. 3.

The resistance encountered when depressing or displacing upward the control lever along its axis in the direction of the arrow $f^2$ to release the end 5¹ of crooked member 5 from the aforesaid shoulder 18 constitutes the detent positioning force to be overcome to shift to reverse by moving the lever 1 in the direction of the arrow $F^2$, thus providing a safety feature preventing the undesired engagement of the reverse when shifting from one forward speed to another and to and from neutral.

To select the desired forward gear line, the control lever 1 is moved in the direction of the arrow $F^1$. In the control lever position shown in FIG. 1, the rod 13 is moved to a position corresponding to the selection line for the first and second speeds, the end 5¹ of crooked member 5 resting upon the shoulder 18 of member 17. To shift to first and second gears the lever must be turned either right or left, this lever carrying along, during this rotational movement, through the medium of ball 14, the rod 13 driving in turn the sliding hubs of the gearbox.

From the position shown in FIG. 1, when the control lever 1 is moved in the direction of the arrow $F^1$, the gearbox is shifted to neutral, and if the rocking movement about the pivot pin 6 is continued the position of FIG. 4 corresponding to the displacement of rod 13 for selecting the third and fourth speeds is obtained by rotating the lever 1 and therefore the rod 13 either right or left.

FIG. 3 illustrates a typical form of embodiment of the adjustments means whereby the ends 5¹ of the crooked member 5 may be caused to engage the shoulder 18 of member 7 according to a position of rod 13 which is determined by construction of the gearbox. To this end, the ball 14 is formed with a transverse hole 21 (FIG. 2) to which access may be gained from the outside of the widened portion 3 through a transverse slot formed in this portion, by using for example a tool engageable in this transverse hole 21 for rotating the ball 14 about its pin 22 supporting the rod 13. As a result, due to the eccentric mounting of the ball on its pin, a displacement of the control lever 1 and of the socket 5 is obtained whereby the end portion 5¹ of socket 5 may be properly adjusted in relation to the shoullder 18. Of course, this adjustment within the control lever is not necessary if a separate adjustment device is provided in the control arrangement for example in the transmission linkage.

This gearbox control arrangement has been described with specific reference to the case of a lever mounted on the instrument panel of the vehicle, but it will be readily understood by anybody conversant with the art that it is also applicable to a different mounting of the control lever, for example under the steering wheel on the steering column.

The gearbox control device of this invention meets in an economical way the requirements by which the gear selection, gear shift and safety in the engagement of the reverse are attended.

The use of moulded plastic according to modern technique has led to shapes associating a considerable strength with a moderate volume; moreover, this material is noiseless.

The detent-positioning means provided by this invention utilizes but a very small number of parts and is particularly sturdy.

The stop of the detent-positioning device is adjustable by means of very simple means utilizing an eccentric ball.

Although the present invention has been described in conjunction with a preferred embodiment, it is to be understood that modifications and variations may be resorted to without departing from the spirit and scope of the invention, as those skilled in the art will readily understand. Such modifictaions and variations are considered to be within the purview and scope of the invention and appended claims.

I claim:

1. A gear-shift control device for selectively engaging and disengaging the gears of a gearbox having four forward speeds and one reverse speed, said device comprising a fixed bearing; a socket rotatably mounted, and held against axial displacement, in said bearing; a gearbox control rod extending freely through said socket, said control rod having at one end a bent portion extending generally radially in relation to the axis of said socket; a hollow hand lever extending over said bent end portion for imparting axial and angular movements to said control rod, said hand lever having an inner end formed with an angular end portion; a transverse pin and generally radial slot connection between said angular end portion and said socket to one side thereof to enable pivotal movement of said lever in the plane of said axis of the socket; a shoulder on the side of said socket opposite said pin and slot connection and adapted to be engaged by said end portion of the hand lever so as normally to limit axial movement of said control rod by said hand lever between a first position in which two of the forward speeds can be engaged upon subsequent angular movement of said rod by said lever and a second position in which the remaining two forward speeds can be engaged upon subsequent angular movement of said rod by said lever, said shoulder being adapted to be cleared upon translationary displacement of said lever with respect to the axis of said rod, permitted by said generally radial slot, so as to allow of axial movement of said rod by subsequent pivotal actuation of said lever into a third position in which said reverse speed can be engaged by angular movement of said rod by said lever; a ball eccentrically mounted on said bent end portion of the rod and slidably engaged by the inside of said hollow lever to transmit the motions of said lever to said rod, said ball being rotatably adjustable about said bent end portion of the rod to coincide with the position of engagement between said shoulder and said crooked portion of the lever; and spring means between said ball and a seating inside said hollow lever for normally preventing clearance of said shoulder by said angular end portion upon pivotal actuation of the lever.

2. A gear shift control device for selectively engaging and disengaging the gears of a gear box having four forward speeds and one reverse speed comprising an annular bearing, a hollow socket rotatably carried in said bearing, said socket fixed axially of said bearing, a downwardly depending portion on said socket having an elongated vertical slot therein, a lever with a downwardly extending portion and an arcuate upper tubular portion, a transverse pin secured to said arcuate portion and extending through said slot to pivotally connect the lever to said socket, said lever having a conical hollow section therein adjacent and below said arcuate tubular portion, a bent gear box control rod extending through said socket, arcuate portion and conical hollow section, a ball member secured to the end of said rod in said conical section, spring means in said conical section below said rod end and bearing against said ball member and the surface of said conical section, shoulders on said socket opposite said elongated slot, the edge of said tubular member being adapted to abut one of said shoulders when said lever is pulled downwardly to select a forward speed and to clear said shoulders when said lever is pushed upwardly, said spring means being disposed to have its axis offset with respect to the axis of the ball member when said lever is pushed upwardly.

References Cited in the file of this patent

UNITED STATES PATENTS

| | | |
|---|---|---|
| 1,024,237 | Welker | Apr. 23, 1912 |
| 2,235,975 | Best | Mar. 25, 1941 |
| 2,522,321 | Wahlberg | Sept. 12, 1950 |
| 2,680,971 | Kreiner | June 15, 1954 |
| 2,693,714 | Adloff | Nov. 9, 1954 |
| 2,860,538 | Bruet | Nov. 18, 1958 |
| 3,035,619 | Gaskell | May 22, 1962 |

FOREIGN PATENTS

| | | |
|---|---|---|
| 535,746 | Great Britain | Apr. 21, 1941 |
| 1,008,560 | France | Feb. 27, 1952 |